United States Patent
Poznanski

(10) Patent No.: US 9,942,769 B2
(45) Date of Patent: Apr. 10, 2018

(54) SYSTEM AND METHOD FOR IDENTIFYING GENUINE BASE STATIONS THAT SERVE ROGUE BASE STATIONS

(71) Applicant: Verint Systems Ltd., Herzliya Pituach (IL)

(72) Inventor: Arik Poznanski, Ramat Gan (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

(21) Appl. No.: 15/334,423

(22) Filed: Oct. 26, 2016

(65) Prior Publication Data

US 2017/0127286 A1    May 4, 2017

(30) Foreign Application Priority Data

Oct. 29, 2015  (IL) .......................................... 242354

(51) Int. Cl.
  *H04W 12/12* (2009.01)
  *H04W 12/06* (2009.01)
  *H04W 64/00* (2009.01)
  *H04W 24/08* (2009.01)

(52) U.S. Cl.
  CPC ........... *H04W 12/12* (2013.01); *H04W 12/06* (2013.01); *H04W 24/08* (2013.01); *H04W 64/003* (2013.01)

(58) Field of Classification Search
  CPC ................................................. H04W 12/12
  See application file for complete search history.

(56) References Cited

U.S. PATENT DOCUMENTS

| 8,351,900 | B2 | 1/2013 | Lotvonen et al. |
| 9,547,766 | B2 * | 1/2017 | Turgeman ............. H04W 12/06 |
| 2014/0004829 | A1 * | 1/2014 | Rieger .................. H04W 12/12 455/411 |
| 2015/0140097 | A1 | 5/2015 | Goldfarb |

FOREIGN PATENT DOCUMENTS

WO     2010/116292    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Michael T Vu
(74) *Attorney, Agent, or Firm* — Meunier Carlin & Curfman

(57) ABSTRACT

Methods and systems for determining the identity of a genuine Base Station (BS) that serves a rogue BS, i.e., the genuine BS used by the rogue BS to exchange the communication between the solicited terminal and the cellular network. The ability to identify rogue-serving BSs is a valuable tool in combatting rogue BSs. For example, the rogue BS will often be located in close proximity to the rogue-serving BS, at least in closer proximity than other genuine BSs. Identifying the rogue-serving BS may therefore assist in locating the rogue BS. Additionally or alternatively, identifying the rogue-serving BS may assist in interfering with the operation of the rogue BS, and/or obtaining information regarding wireless terminals solicited by the rogue BS.

17 Claims, 1 Drawing Sheet

(56) References Cited

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.
"Cell Scanning and Catcher Detection in unnoticeable pocket size," NetHawk C2, Data sheet, version 1.4, EXFO, 2010, 4 pages.
Girardin, F., et al., "Detecting air travel to survey passengers on a worldwide scale," Journal of Location Based Services, 2010, 26 pages.
Kostrzewa, A., "Development of a man in the middle attack on the GSM Um-Interface," Master Thesis, 2011, 88 pages.
Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.
Strobel, D., "IMSI Catcher," Seminararbeit, Ruhr-Universität Bochum, 2007, pp. 13-24.
Vedaldi, A., "An implementation of SIFT detector and descriptor," University of California at Los Angeles, 2007, 7 pages.

\* cited by examiner

SYSTEM AND METHOD FOR IDENTIFYING GENUINE BASE STATIONS THAT SERVE ROGUE BASE STATIONS

FIELD OF THE DISCLOSURE

The present disclosure relates generally to wireless communication monitoring, and particularly to methods and systems for identifying rogue base stations.

BACKGROUND OF THE DISCLOSURE

Rogue base stations are used in various applications that involve tracking, eavesdropping and/or collecting information on cellular phones or other mobile communication terminals. Some rogue base stations solicit a tracked terminal to reveal its International Mobile Subscriber Identity (IMSI). Therefore, rogue base stations are commonly referred to as "IMSI catchers."

Examples of IMSI catching techniques are described, for example, by Strobel in "IMSI Catcher," Jul. 13, 2007, by Asokan et al., in "Man-in-the-Middle Attacks in Tunneled Authentication protocols," the 2003 Security Protocols Workshop, Cambridge, UK, Apr. 2-4, 2003, and by Meyer and Wetzel in "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, Barcelona, Spain, Sep. 5-8, 2004, pages 2876-2883, which are all incorporated herein by reference.

Several techniques for detecting IMSI catchers are known in the art. For example, the Open Source Mobile Communication Base Band (OsmocomBB), or Open Source GSM Baseband project, supports free software that can be uploaded to a mobile phone. The program configures a cellular phone to detect and report to the subscriber when the phone is being tracked by an IMSI catcher. Nethawk Oyj (Oulu, Finland) offers a product called Nethawk-C2 that performs cell scanning and IMSI catcher detection.

U.S. Pat. No. 8,351,900, whose disclosure is incorporated herein by reference, describes techniques for detecting a rogue base station. A disclosed method receives signaling messages by a mobile apparatus at least from one base station of a cellular network, interprets a received signaling message, searches for an anomaly with at least one signaling parameter of the received signaling message from a first base station to a known comparison signaling parameter, and gives an alert if the comparison gives an unequal result concerning at least one signaling parameter.

SUMMARY OF THE DISCLOSURE

An embodiment that is described herein provides a method including receiving Radio Frequency (RF) signals in a vicinity of a cellular network. Based on the received RF signals, a detection is made that a rogue base station mediates between a wireless communication terminal and the cellular network, and an identity of a base station of the cellular network that serves the rogue base station is found.

In some embodiments, detecting the rogue base station includes detecting in a given time period two authentication processes that both pertain to the wireless communication terminal. In an embodiment, finding the identity of the base station that serves the rogue base station includes identifying two base stations that conduct the two authentication processes, and deciding which of the two base stations is the base station that serves the rogue base station.

In some embodiments, the method further includes estimating a geographical location of the rogue base station based on the identity of the base station that serves the rogue base station. Estimating the geographical location of the rogue base station may include defining a search area, in which the rogue base station is assumed to be located, based on the identity of the base station that serves the rogue base station. In another embodiment, receiving the RF signals includes receiving a report in which the rogue base station reports signal strengths of one or more base stations as received at the rogue base station, and estimating the geographical location of the rogue base station includes assessing the geographical location based on the report.

In some embodiments, the method further includes interfering with operation of the rogue base station using the base station that serves the rogue base station. In an example embodiment, interfering with the operation of the rogue base station includes sending a message that causes termination of a connection between the rogue base station and the base station that serves the rogue base station.

In some embodiments, the method further includes obtaining information regarding a wireless terminal that is solicited by the rogue base station. In a disclosed embodiment, obtaining the additional information includes sending to the base station that serves the rogue base station a message, which causes the cellular network to respond with a reply that specifies a fixed identifier of the rogue base station. In an embodiment, receiving the RF signals includes operating a passive monitoring system in the vicinity of the cellular network.

There is additionally provided, in accordance with an embodiment that is described herein, an apparatus including a receiver and a processor. The receiver is configured to receive Radio Frequency (RF) signals in a vicinity of a cellular network. The processor is configured to detect, based on the received RF signals, that a rogue base station mediates between a wireless communication terminal and the cellular network, and to find an identity of a base station of the cellular network that serves the rogue base station.

The present disclosure will be more fully understood from the following detailed description of the embodiments thereof, taken together with the drawings in which:

DETAILED DESCRIPTION OF EMBODIMENTS

Overview

A rogue Base Station (BS) typically solicits a wireless terminal (e.g., cellular phone) to reselect from its legitimate cellular network and start communicating with the rogue base station. A rogue BS may then mediate between the terminal and the cellular network, e.g., in order to monitor the calls that the terminal conducts.

In this mode of operation, the rogue BS establishes two wireless connections—One connection with the terminal and another connection with a genuine BS of the cellular network. On the first connection (with the terminal) the rogue BS imitates a genuine BS of the cellular network. On the second connection (with the genuine BS of the cellular network) the rogue BS imitates the terminal. The terminal and the network are typically unaware of the existence of the rogue BS that mediates between them.

Embodiments that are described herein provide methods and systems for determining the identity of a genuine BS that serves a rogue BS, i.e., the genuine BS used by the rogue BS to exchange the communication between the solicited terminal and the cellular network. A genuine BS that serves a rogue BS is referred to herein as a "rogue-serving BS" for brevity.

The ability to identify rogue-serving BSs is a valuable tool in combatting rogue BSs. For example, the rogue BS will often be located in close proximity to the rogue-serving BS, at least in closer proximity than other genuine BSs. Identifying the rogue-serving BS may therefore assist in locating the rogue BS. Additionally or alternatively, identifying the rogue-serving BS may assist in interfering with the operation of the rogue BS, and/or obtaining information regarding wireless terminals solicited by the rogue BS.

Several example methods for identifying a rogue-serving BS are described herein, as well as example methods for combatting rogue BSs based on such identification. In some embodiments, the disclosed techniques are carried out by a passive monitoring system that is deployed in the vicinity of the cellular network.

System Description

Figure 1:
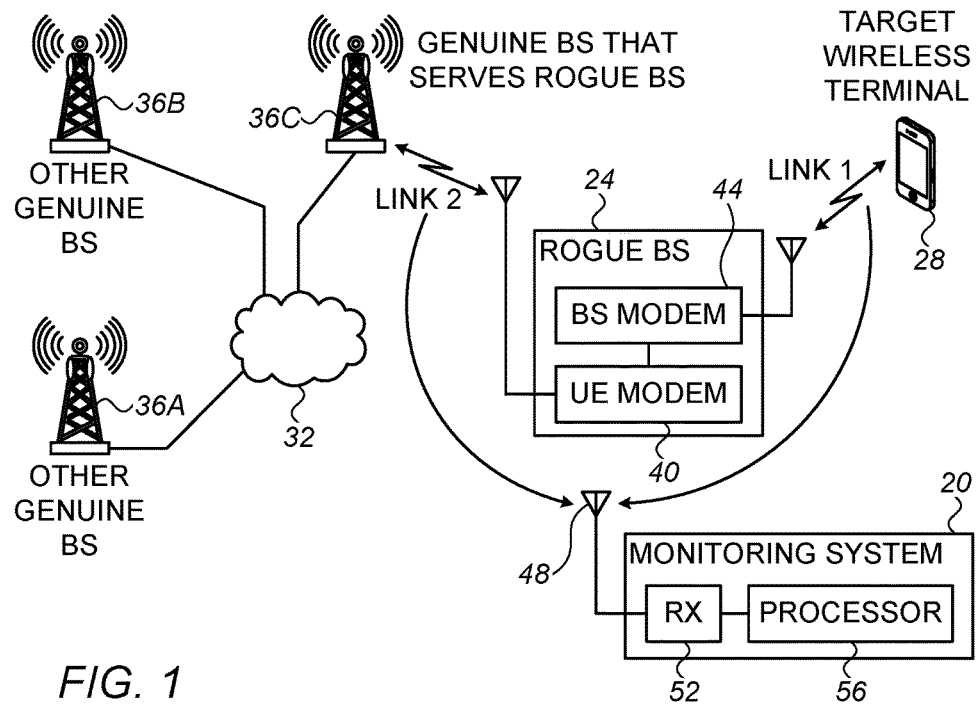
FIG. 1 is a block diagram that schematically illustrates a system for identifying a genuine BS that serves a rogue BS, in accordance with an embodiment that is described herein.

FIG. 1 is a block diagram that schematically illustrates a monitoring system 20, in accordance with an embodiment that is described herein. System 20 detects scenarios in which a rogue Base Station (BS) mediates between a wireless terminal and a legitimate cellular network, by first identifying a genuine BS in the cellular network that serves the rogue BS. A BS of the cellular network that serves a rogue BS is referred to herein as a "rogue-serving BS."

System 20 is typically deployed in the vicinity of a cellular network 32. Network 32 comprises multiple BSs 36. The figure shows only three BSs 36A, 36B and 36C, for the sake of clarity. Network 32 provides communication services to wireless communication terminals 28, also referred to as User Equipment (UE). Terminals 28 may comprise, for example, mobile phones, smart-phones, wireless-enabled computers, or any other suitable wireless devices. BSs 36 and terminals 28 may communicate using any suitable communication protocol, such as Global System for Mobile Communications (GSM), Universal Mobile Telecommunications System (UMTS) or Long Term Evolution (LTE).

In the present example, a rogue BS 24 has solicited a wireless terminal 28 to communicate with network 32 via the rogue BS. The terminal in question is referred to herein as a target terminal. Rogue BS mediates between target terminal 28 and network 32 via one of the genuine BSs of network 32, in the present example BS 36C. Thus, in this scenario BS 36C acts as a rogue-serving BS.

For mediating between terminal 28 and network 32, rogue BS 24 establishes two wireless connections denoted LINK1 and LINK2. Both connections conform to the communication protocol used by network 32 and terminal 28 (e.g., GSM, UMTS or LTE).

Over LINK1, rogue BS 24 communicates with terminal 28 while imitating a legitimate BS of network 32. In an example embodiment, rogue BS 24 copies one or more identifiers and/or parameters of some genuine BS 36 (not necessarily of rogue-serving BS 36C), and uses these identifiers and/or parameters for communicating with terminal 28. Terminal 28 is thus fooled to believe it is communicating with network 32 directly.

Over LINK2, rogue BS 24 communicates with BS 36C while imitating terminal 28. In an example embodiment, rogue BS 24 copies one or more identifiers and/or parameters of terminal 28, and uses these identifiers and/or parameters for communicating with BS 36C. BS 36C is thus fooled to believe it is communicating with terminal 28 directly.

In the present example, rogue BS comprises a BS modem 44 for communicating over LINK1, and a UE modem 40 for communicating over LINK2. Transmissions from terminal 28 to network 32 go through LINK1, and are then relayed by rogue BS 24 over LINK2 to BS 36C. Transmissions from BS 36C to terminal 28 go through LINK2, and are then relayed by rogue BS 24 over LINK1 to terminal 28. While performing this mediation, rogue BS 24 may eavesdrop to the relayed communication, e.g., extract the data between modem 40 and modem 44.

In some embodiments, system 20 comprises at least one antenna 48, a receiver (RX) 52, and a processor 56 that carries out the methods described herein. In some embodiments, system 20 is passive. Generally, receiver 52 is configured to monitor both uplink and downlink communication channels. In particular, receiver 52 is capable of receiving downlink Radio Frequency (RF) signals from BSs 36 and from BS modem of rogue BS 24, as well as uplink RF signals from terminals 28 and from UE modem 40 of rogue BS 24. Thus, RX 52 is able to monitor the bidirectional communication over both LINK1 and LINK2. As will be explained below, this monitoring is used by processor 56 to (i) identify the existence of a rogue BS, and (ii) find the identity of the rogue-serving BS.

The configuration of system 20 shown in FIG. 1 is an example configuration, which is chosen purely for the sake of conceptual clarity. In alternative embodiments, any other suitable system configuration can be used. Some elements of system 20 may be implemented in hardware, e.g., in one or more Application-Specific Integrated Circuits (ASICs) or Field-Programmable Gate Arrays (FPGAs). Additionally or alternatively, some elements of system 20 can be implemented using software, or using a combination of hardware and software elements. Further additionally or alternatively, some of the functions of system 20 can be implemented using off-the-shelf modem units.

Typically, processor 56 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Identifying Rogue-Serving BS

Figure 2:
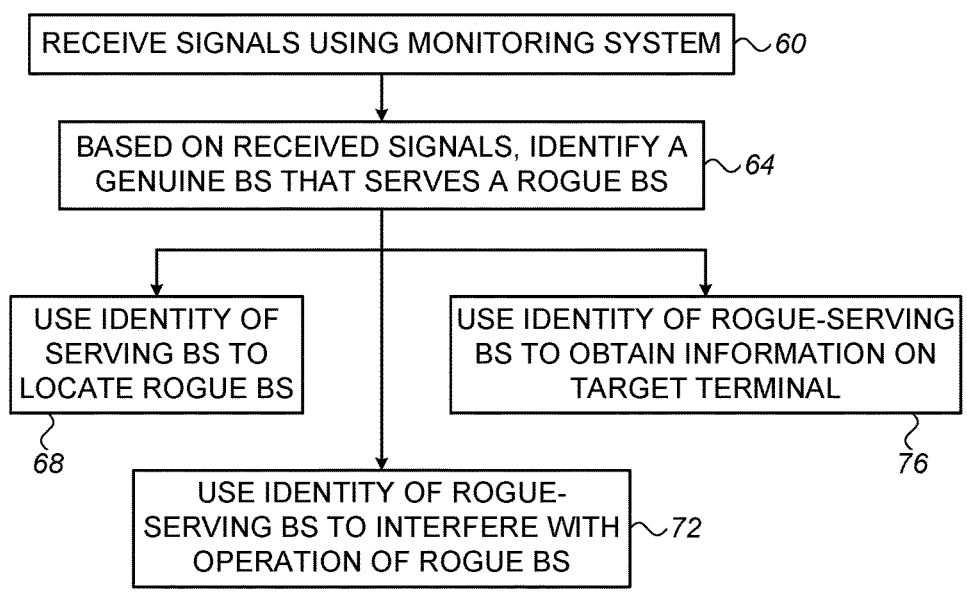
FIG. 2 is a flow chart that schematically illustrates a method for identifying a genuine BS that serves a rogue BS, in accordance with an embodiment that is described herein.

FIG. 2 is a flow chart that schematically illustrates a method for identifying a genuine BS that serves a rogue BS, in accordance with an embodiment that is described herein. The method begins with RX 52 of monitoring system 20 receiving RF signals, at a reception step 60. As noted above, the received signals may originate from BSs 36 of network 32, from terminals 28 and/or from UE modem 40 or BS modem 44 of rogue BS 24.

At an analysis step 64, processor 56 of system 20 analyzes the received signals so as to (i) detect the presence of a rogue BS, and (ii) identify the identity of the rogue-serving BS that serves the rogue BS. In the example of FIG. 1, processor 56 may use this method to find that (i) rogue BS 24 is operating in the vicinity of network 32, and (ii) the BS that serves the rogue BS is BS 36C.

Processor 56 may use various methods to perform this identification. For example, when terminal 28 sets-up a call, it attempts to authenticate with network 32. In response to this attempt, the rogue BS carries out two authentication processes in parallel. The first authentication process is performed over LINK1, between terminal 28 and BS modem 44 of rogue BS 24. (The terminal intends to carry out the authentication process with network 32, and is unaware that the authentication is in fact carried out over LINK 1 vis-à-vis rogue BS 24.) The second authentication process is performed over LINK2, between UE modem 40 of rogue BS 24 and network 32 (via BS 36C). The rogue BS typically carries out the second authentication process while reusing the identifiers and authentication parameters of terminal 28.

Thus, processor 56 may analyze the received signals and discover two authentication processes that occur during the same time period and pertain to the same terminal. Upon detecting such a scenario, processor 56 may conclude that the authentication processes relate to a call established via an intermediate rogue BS. By analyzing the two authentication processes, processor 56 may also determine the identity of the rogue-serving BS.

In an example embodiment, processor 56 detects a scenario in which two BSs conduct authentication processes with the same terminal identifier. Processor 56 first concludes that one of these BSs is a rogue BS and one is a rogue-serving BS. Processor 56 may then use various criteria for deciding which BS is the rogue BS and which is the rogue-serving BS.

For example, processor 56 may check which of the two BSs transmitted an authentication response first, and conclude that this BS is the rogue-serving BS and the other is the rogue BS. As another example, processor 56 may use some known technique for identifying that one of the two BSs is a rogue BS, and therefore decide that the other BS is the rogue-serving BS. Example techniques for identifying rogue BSs are described, for example, in the Background section of the present patent application, as well as in U.S. Patent Application Publication 2015/0140997, which is assigned to the assignee of the present patent application and whose disclosure is incorporated herein by reference. In another embodiment, processor 56 may be able to decide that one of the two BSs is a genuine BS of network 32, and therefore conclude that this BS is the rogue-serving BS and the other BS is the rogue BS.

In alternative embodiments, processor 56 may identify the presence of a rogue BS, and the identity of the rogue-serving BS, in any other suitable way.

Identifying the rogue-serving BS (BS 36C in the present example) can be used in various ways to combat rogue BS 24. At a location step 68, processor 56 uses the identity of the rogue-serving BS to estimate the geographical location of the rogue BS. The estimated geographical location helps in physically finding and apprehending the rogue BS. For example, in most cases the rogue BS will be located nearer to the rogue-serving BS, than to the other genuine BSs of network 32. Therefore, by finding the identity of the rogue-serving BS, it may be possible to define a (relatively small) suspected search area that needs to be searched in order to find the rogue BS.

As another example, in some cellular communication protocols the wireless terminal transmits Network Management Reports (NMR), which indicate the received signal strengths of one or more BSs of the cellular network. The set of received signal strengths is indicative of the terminal's location. In some embodiments, UE modem 40 of rogue BS 24 operates in a similar manner. Thus, system 20 may receive the NMRs sent by UE modem 40, and use the signal strengths reported in the NMRs to estimate the geographical location of rogue BS 24.

At an interference step 72, system 20 uses the identity of the rogue-serving BS to interfere with the operation of the rogue BS. In one embodiment, system 20 communicates with the rogue-serving BS (BS 36C) while impersonating UE modem 40 of the rogue BS, in order to interfere with the rogue-BS operation. For example, system 20 may send BS 36C an "IMSI detach" message that appears to originate from UE modem 40 of the rogue BS. This message would cause BS 36C to terminate the connection with rogue BS 24 (LINK 2). From that point in time, target terminal 28 will not be able to conduct calls via BS 36C. Additionally or alternatively, system 20 may send an "IMSI detach" message to rogue BS 24, achieving a similar result. Further alternatively, system may use the identity of the rogue-serving BS to interfere with the operation of rogue BS 24 in any other suitable way.

At an information obtaining step 76, system 20 uses the identity of the rogue-serving BS to obtain additional information regarding target terminal 28 solicited by the rogue BS. For example, system 20 may impersonate modem 44 of rogue BS 24 and send a message (e.g., SMS or MMS) to target terminal 28. In response to the message, the target terminal would send system 20 a reply that specifies the target terminal's Mobile Station International Subscriber Directory Number (MSISDN), i.e., the target terminal's phone number. The target terminal's IMSI can be extracted from the signals received from the rogue BS. Alternatively, system 20 may use the identity of the rogue-serving BS to obtain any suitable information on target terminal 28, in any other suitable way.

The method of FIG. 2 is an example method, which is depicted purely for the sake of conceptual clarity. For example, alternative methods may comprise only a subset of steps 68, 72 and 76. In alternative embodiments, the disclosed techniques can be implemented in any other suitable manner. For example, system 20 may find the identity of the rogue-serving BS, and/or use the identity of the rogue-serving BS, in any other way.

As can be appreciated, in some implementations of steps 72 and 76 system 20 should be active, e.g., transmit messages to network 32 or to rogue BS 24. System 20 may comprise a suitable transmitter (not shown in the figures) for this purpose.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving Radio Frequency (RF) signals in a vicinity of a cellular network; and
   based on the received RF signals, detecting that a rogue base station mediates between a wireless communication terminal and the cellular network, and finding an identity of a base station of the cellular network that serves the rogue base station, wherein the detecting the rogue base station comprises detecting in a given time period two authentication processes that both pertain to the wireless communication terminal, and wherein the finding the identity of the base station that serves the rogue base station comprises identifying two base stations that conduct the two authentication processes, and deciding which of the two base stations is the base station that serves the rogue base station.

2. The method according to claim 1, and comprising estimating a geographical location of the rogue base station based on the identity of the base station that serves the rogue base station.

3. The method according to claim 2, wherein estimating the geographical location of the rogue base station comprises defining a search area, in which the rogue base station is assumed to be located, based on the identity of the base station that serves the rogue base station.

4. The method according to claim 2, wherein receiving the RF signals comprises receiving a report in which the rogue base station reports signal strengths of one or more base stations as received at the rogue base station, and wherein estimating the geographical location of the rogue base station comprises assessing the geographical location based on the report.

5. The method according to claim 1, and comprising interfering with operation of the rogue base station using the base station that serves the rogue base station.

6. The method according to claim 5, wherein interfering with the operation of the rogue base station comprises sending a message that causes termination of a connection between the rogue base station and the base station that serves the rogue base station.

7. The method according to claim 1, and comprising obtaining information regarding a wireless terminal that is solicited by the rogue base station.

8. The method according to claim 7, wherein obtaining the additional information comprises sending to the base station that serves the rogue base station a message, which causes the cellular network to respond with a reply that specifies a fixed identifier of the rogue base station.

9. The method according to claim 1, wherein receiving the RF signals comprises operating a passive monitoring system in the vicinity of the cellular network.

10. An apparatus, comprising:
    a receiver, which is configured to receive Radio Frequency (RF) signals in a vicinity of a cellular network; and
    a processor, which is configured to detect, based on the received RF signals, that a rogue base station mediates between a wireless communication terminal and the cellular network by detecting, in a given time period, two authentication processes that both pertain to the wireless communication terminal, and to find an identity of a base station of the cellular network that serves the rogue base station by identifying two base stations that conduct the two authentication processes, and deciding which of the two base stations is the base station that serves the rogue base station.

11. The apparatus according to claim 10, wherein the processor is configured to estimate a geographical location of the rogue base station based on the identity of the base station that serves the rogue base station.

12. The apparatus according to claim 11, wherein the processor is configured to define a search area, in which the rogue base station is assumed to be located, based on the identity of the base station that serves the rogue base station.

13. The apparatus according to claim 11, wherein the receiver is configured to receive a report in which the rogue base station reports signal strengths of one or more base stations as received at the rogue base station, and wherein the processor is configured to estimate the geographical location of the rogue base station based on the report.

14. The apparatus according to claim 10, wherein the processor is configured to interfere with operation of the rogue base station using the base station that serves the rogue base station.

15. The apparatus according to claim 14, wherein the processor is configured to interfere with the operation of the rogue base station by sending a message that causes termination of a connection between the rogue base station and the base station that serves the rogue base station.

16. The apparatus according to claim 10, wherein the processor is configured to obtain information regarding a wireless terminal that is solicited by the rogue base station.

17. The apparatus according to claim 16, wherein the processor is configured to send to the base station that serves the rogue base station a message, which causes the cellular network to respond with a reply that specifies a fixed identifier of the rogue base station.

* * * * *